(12) United States Patent
Harris

(10) Patent No.: US 8,944,450 B2
(45) Date of Patent: Feb. 3, 2015

(54) MOUNTABLE WATER SPRAY SHIELD

(71) Applicant: James Harris, Mechanicsburg, PA (US)

(72) Inventor: James Harris, Mechanicsburg, PA (US)

(*) Notice: Subject to any disclaimer, the term of this patent is extended or adjusted under 35 U.S.C. 154(b) by 105 days.

(21) Appl. No.: 13/694,730

(22) Filed: Dec. 28, 2012

(65) Prior Publication Data
US 2014/0182682 A1 Jul. 3, 2014

(51) Int. Cl.
*F16M 1/00* (2006.01)
*B62D 25/18* (2006.01)

(52) U.S. Cl.
CPC .................. *B62D 25/188* (2013.01)
USPC ........................................................ 280/154

(58) Field of Classification Search
CPC ...... B62D 25/18; B62D 25/188; B62D 25/16; B62D 25/163; B62D 25/182
USPC ................. 280/848, 847, 851, 154; 293/1, 21
See application file for complete search history.

(56) References Cited

U.S. PATENT DOCUMENTS

| | | | | |
|---|---|---|---|---|
| 2,038,234 A | * | 4/1936 | Olen | 280/851 |
| 2,605,119 A | | 7/1952 | Earnest | |
| 2,777,710 A | * | 1/1957 | Panchesine | 280/851 |
| 3,198,545 A | * | 8/1965 | McDaniel | 280/851 |
| 3,244,432 A | * | 4/1966 | Ambli | 280/851 |
| 3,806,197 A | * | 4/1974 | Knyszek et al. | 298/1 SG |
| 3,860,262 A | | 1/1975 | Goings | |
| 3,866,943 A | | 2/1975 | Innis | |
| 4,124,221 A | | 11/1978 | Goings | |
| 4,138,129 A | | 2/1979 | Morris | |
| 4,421,333 A | * | 12/1983 | Van Dyke | 280/851 |
| 4,605,238 A | * | 8/1986 | Arenhold | 280/851 |
| 4,627,594 A | * | 12/1986 | Reed | 248/632 |
| 4,817,976 A | | 4/1989 | Kingsley | |
| 5,027,990 A | | 7/1991 | Sonnenberg | |
| 5,100,177 A | | 3/1992 | Becker | |
| 5,460,411 A | | 10/1995 | Becker | |
| 5,480,174 A | | 1/1996 | Grenier | |
| 5,487,565 A | | 1/1996 | Thompson | |
| 5,839,760 A | | 11/1998 | Johnson | |
| 6,367,841 B1 | | 4/2002 | Matthew | |
| 6,375,223 B1 | * | 4/2002 | Kirckof | 280/851 |
| 6,644,720 B2 | | 11/2003 | Long | |
| 6,942,252 B2 | * | 9/2005 | Buuck et al. | 280/847 |
| 7,458,595 B2 | | 12/2008 | Bonnaud | |
| 7,520,534 B2 | | 4/2009 | Longchamp | |
| 7,625,012 B2 | * | 12/2009 | Hsu | 280/847 |
| 7,793,985 B1 | | 9/2010 | Coloma | |

FOREIGN PATENT DOCUMENTS

DE 19914118385 10/1992
19910605

* cited by examiner

*Primary Examiner* — J. Allen Shriver, II
*Assistant Examiner* — Brian Cassidy
(74) *Attorney, Agent, or Firm* — Kollas and Kennedy; James W. Kollas, Esq.

(57) ABSTRACT

A mountable water spray shield device is shown herein. A rigid sheet, with an inverted, cropped tear-drop profile, is attached to a rear insert section, and is mounted to a designated vehicle within the area defined by the wheel well and between a pair of tires of the designated vehicle via a bracket secured to the undercarriage of the vehicle. During operation of the designated vehicle upon a wet roadway, the mountable water spray shield serves to divert water spray which would otherwise be emitted into the path of adjacent traffic by rotation of the tires upon the wet roadway at speed.

2 Claims, 9 Drawing Sheets

MOUNTABLE WATER SPRAY SHIELD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Invention

This invention is directed toward the field of water spray shielding devices. More particularly, this invention relates to a device which is mounted to the undercarriage of a vehicle and positioned between the wheels of said vehicle in order to divert water spray from being emitted from said vehicle and into the adjacent line of traffic.

2. Discussion of Prior Art

It is common knowledge to anyone who has ever driven down a highway during a rain storm that passing a tractor trailer can be a harrowing experience. That is, tractor trailers tend to emit water spray laterally from their wheels. This spray acts to impair the visibility of any automobile attempting to pass the tractor trailer. In some instances, visibility is reduced to mere inches, greatly increasing the likelihood of an automobile accident.

Many devices have been proposed over the years to address the emission of water spray from a tractor trailer, or similar vehicles. For instance, U.S. Pat. No. 2,605,119 to Earnest shows a splash guard apparatus which completely encloses the trailer wheels of a tractor trailer, and a front guard behind the front wheels of the cab portion of the vehicle. While this approach might be effective, it is certainly cumbersome. The immense weight of the splash guard would certainly decrease a vehicle's mileage. Additionally, fabrication costs associated with such an apparatus would be very high.

U.S. Pat. No. 3,860,262 to Goings shows a slightly more sophisticated side splash guard for trailer trucks. Namely, motor driven panels may be implemented during adverse weather conditions to prevent transverse spray emission. However, the panels are also cumbersome, having been mounted to the outside portion of the trailer, and adding significant extra dimensions to the overall width of said trailer. Moreover, the track used to raise and lower the panels would be susceptible to jams from stones, pebbles, or other common road debris emitted from operation of the wheels even in good driving conditions.

In U.S. Pat. No. 3,866,943 to Innis, a more rudimentary sliding splash guard is shown. The panels in this invention are to be manually adjusted by an individual instead of the motor-driven panels of Goings. Once again, however, the panels are mounted to the outside portion of the trailer, adding significant extra width to said trailer. And, again, the track on which the panels slide could become jammed with various pieces of road debris.

In U.S. Pat. No. 4,124,221 to Goings another side shield is shown. In this attempt, Goings implements a flexible screen together with an endless chain and motor system. This time, Goings attempts to mount the device within the wheel wells of the tractor trailer. Such placement, however, can only impair access to the device should it need to be repaired or replaced. Furthermore, fabrication and maintenance expenses for such a device would be high.

In U.S. Pat. No. 4,138,129 to Morris, a vehicle wheel well skirt device is shown. Said device is mounted over the periphery of a vehicle's wheel wells. The skirt is made of a thin material with many critical points, or areas of stress concentration, and is therefore susceptible to breakage. The shape of the skirt would tend to catch spray instead of diverting it. Repeatedly catching spray would serve to subject the skirt to fatigue issues. Moreover, the shape of the skirt would tend to collect dirt, dust, and other debris increasing the likelihood of structural failure.

As such, there are problems with the devices presented in the prior art in the field of spray shielding devices. The prior art lacks a spray shielding device which is both lightweight, easily mounted, readily accessed, and robust enough to survive exposure to road debris, while still able to divert ample amounts of water spray.

BRIEF SUMMARY OF THE INVENTION

In accordance with the present invention, a mountable water spray shield device is shown herein. Briefly stated, the mountable water spray shield comprises a sheet of rigid material with a thin thickness cut in a roughly inverted, cropped tear-drop profile, a rear insert section, and a mounting bracket.

OBJECTS AND ADVANTAGES

Accordingly, the objects and advantages of the invention are:

A) to provide a water spray shielding device that is lightweight;

B) to provide a water spray shielding device that is easily mounted to a tractor trailer or similar designated vehicle;

C) to provide a water spray shielding device that is readily accessed for maintenance or replacement purposes; and D) to provide a water spray shielding device that is able to survive exposure to road debris in addition to the emission of transverse water spray;

Further objects and advantages are to provide a water spray shielding device that diverts water spray from being emitted from a vehicle, on which the device is mounted, into an adjacent line of traffic.

REFERENCE NUMERALS IN DRAWINGS

Figure 1:
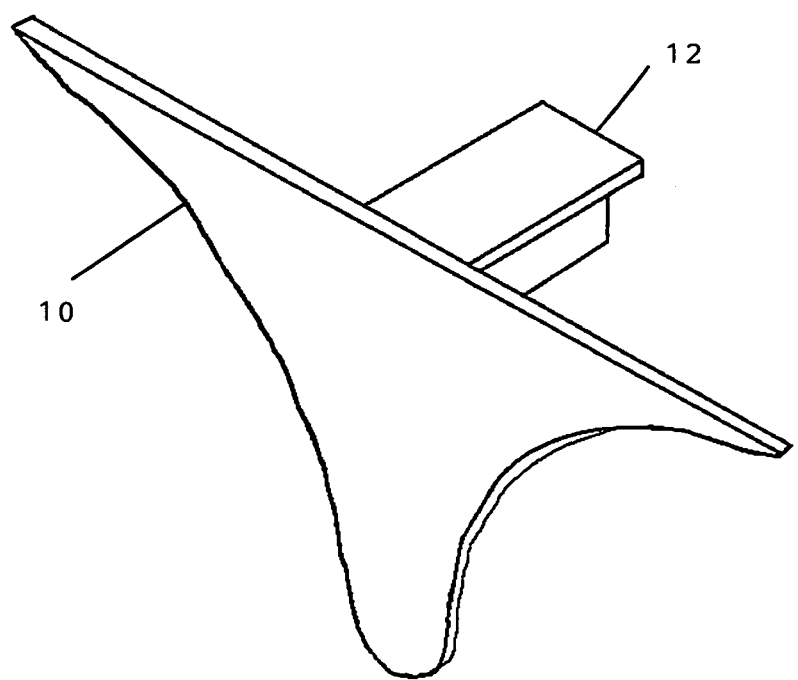
FIG. 1 is an Isometric View of the Rigid Sheet and Rear Insert Section

10 Rigid sheet
12 Rear insert section

14 Fastening means
16 Mounting means
18 First alternative mounting means
20 Second alternative mounting means
22 Mounting fastening means
24 Fastener
26 Rear insert hole
28 Frame mounting hole(s)
30 Mounting fastening hole
32 Bracket
34 Vehicle frame
36 Wheel well
38 Tires

DETAILED DESCRIPTION OF INVENTION

In its most simple configuration, the mountable water spray shield comprises a sheet of rigid and sturdy material with a thin thickness cut in a roughly inverted, cropped tear-drop profile; a rear insert section, with a fastening means; and a mounting bracket with a mounting and a fastening means.

In the preferred embodiment of the invention, a thin, rigid sheet 10 is cut in a roughly inverted, cropped tear-drop profile. A rear insert section 12 is attached to the back of the rigid sheet 10 by any conventional means. In the preferred embodiment, rear insert section 12 has a "T" shaped cross-section. See FIG. 1. However, many different cross-section shapes could serve.

Figure 3:
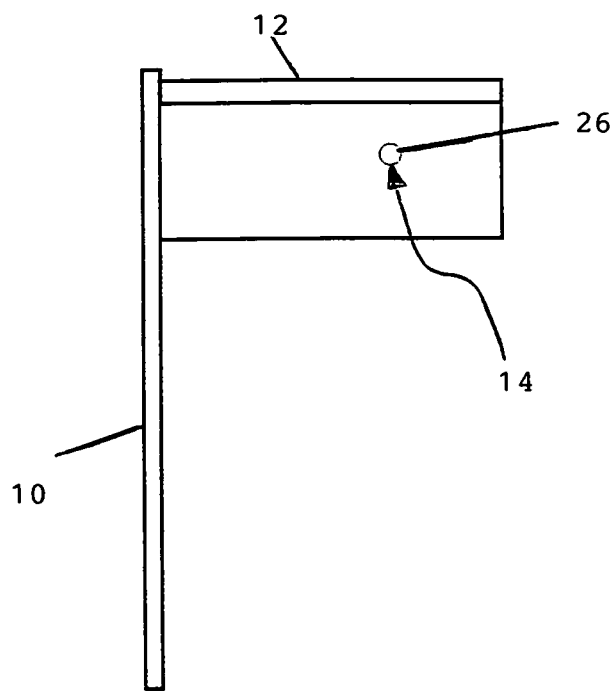
FIG. 3 is a Side View of the Rigid Sheet and Rear Insert Section

Additionally, rear insert section 12 is fitted with fastening means 14, which will secure rear insert section 12 to mounting means 16. In the preferred embodiment, fastening means 14 implements fastener 24 which is preferably a cotter pin assembly together with a rear insert hole 26. See FIG. 3.

Figure 4:
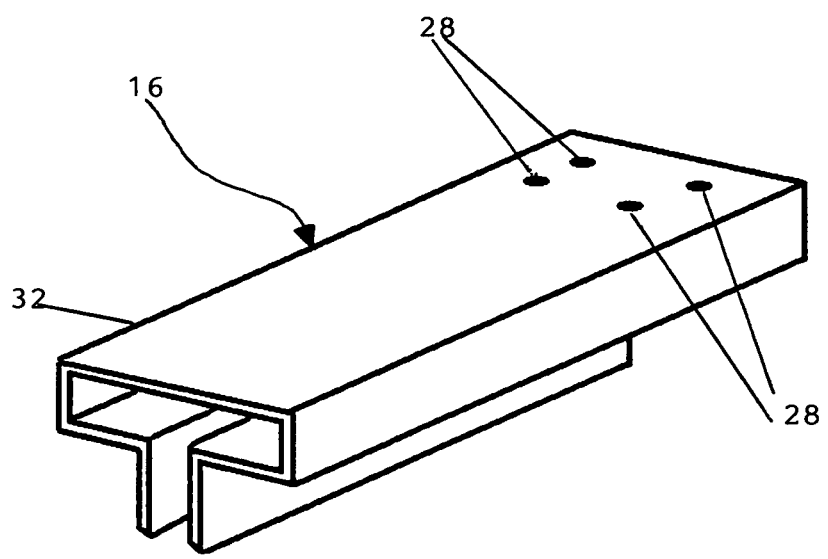
FIG. 4 is an Isometric View of the Mounting Means

Mounting means 16 is attached to the designated target vehicle perpendicular to the length of the vehicle body upon its cross supports on the vehicle frame 34, within the vehicle wheel well 36, and between the tires 38 of the vehicle. In the preferred embodiment, a plurality of frame mounting holes 28 are used to bolt, pin, or otherwise secure mounting means 16 to the intended vehicle frame. See FIG. 4.

In the preferred embodiment, mounting means 16 is a bracket 32 with hollow interior, which has a "T" shaped cross-section to allow the preferred embodiment of rear insert section 12 to be inserted into mounting means 16. See FIG. 4. Once again, the cross-sectional shape of mounting means 16 could vary, but should correspond to the implemented cross-sectional shape of rear insert section 12.

Figure 2:
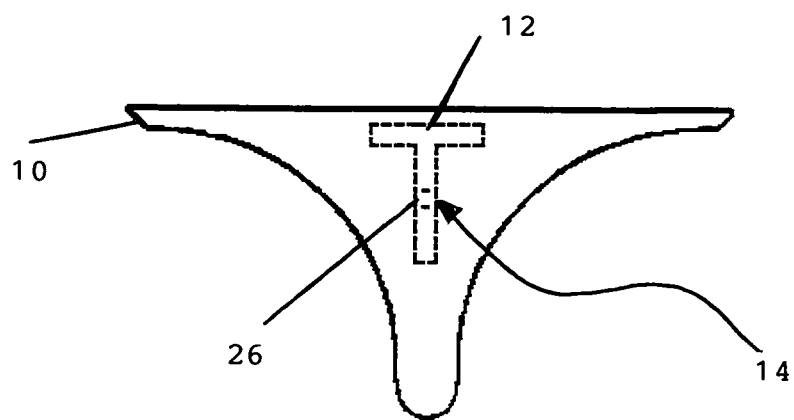
FIG. 2 is a Front View of the Rigid Sheet and Rear Insert Section
Figure 5:
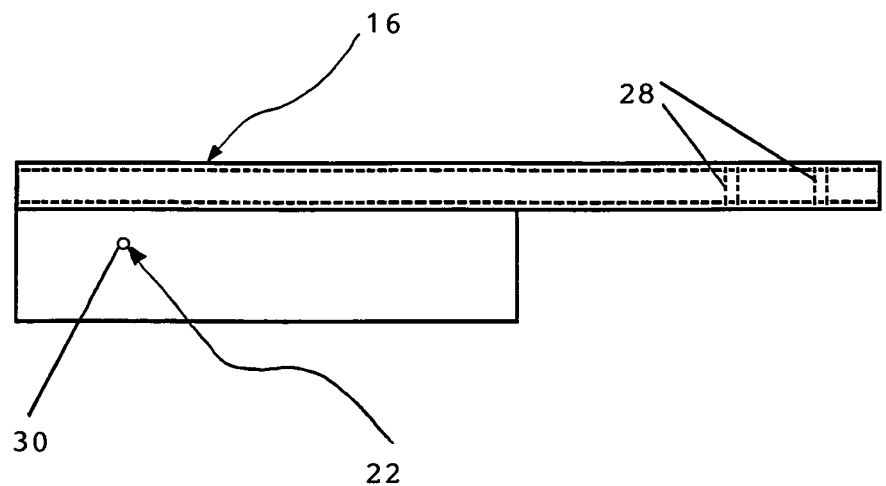
FIG. 5 is a Side View of the Mounting Means

After mounting means 16 is mounted to the designated vehicle, rear insert section 12 is placed within mounting means 16, fastening means 14 is aligned with a mounting fastening means 22, and fastener 24 is used to secure the assembled device. In the preferred embodiment, fastening means 14 is a rear insert hole 26 running through rear insert section 12, mounting fastening means 22 is a mounting fastening hole 30 running through mounting means 16, and fastener 24 is preferably a cotter pin assembly, which is placed through said holes and then locked into place in the usual manner. See FIGS. 2, 3, and 5.

Figure 9:
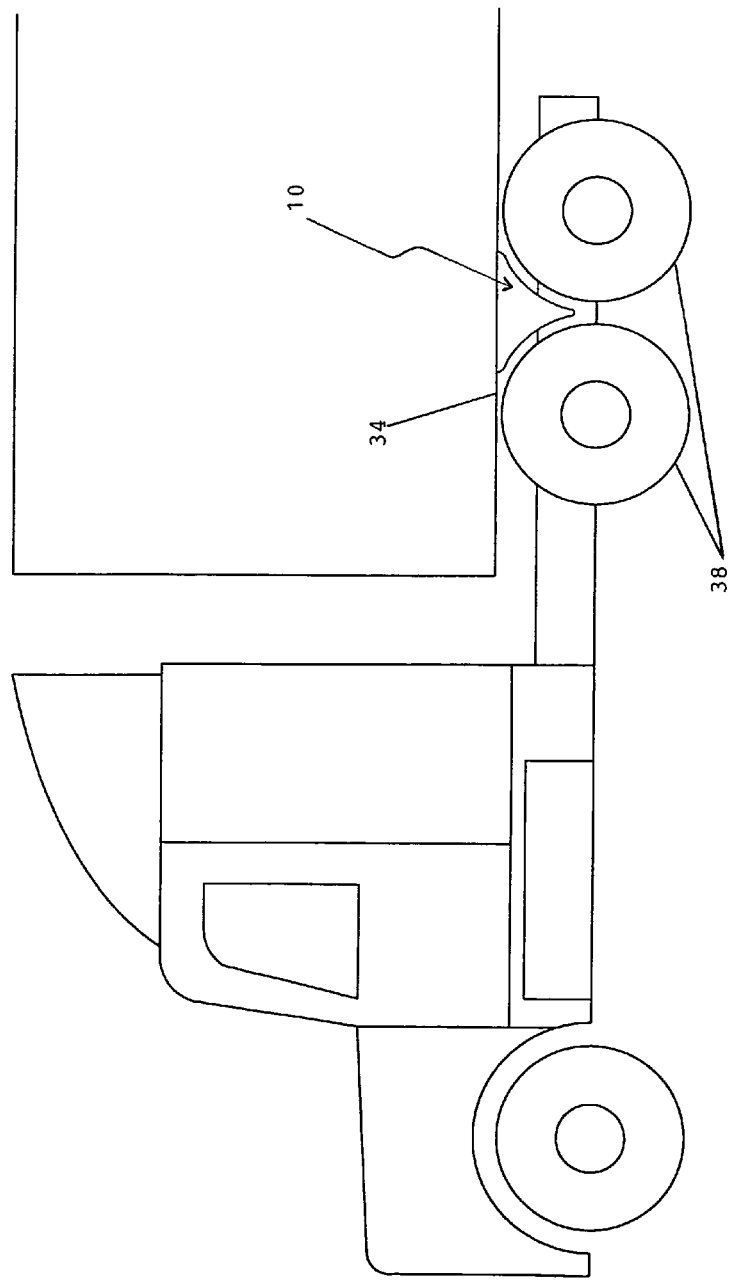
FIG. 9 is a Side View of the Rigid Sheet placed on a Vehicle Frame, within the area defined by the Wheel Well and Between a Pair of Tires

When properly mounted into a vehicle and during travel upon a wet roadway, the water spray shielding device serves to divert water spray from the vehicle's tires away from adjacent traffic. Proper mounting is accomplished when rigid sheet 10 is positioned perpendicular to the length of the vehicle frame 34, between a pair of tires 38, and just beyond the outer walls of the pair of tires 38. After proper mounting, water spray, which would otherwise be emitted from the wheel well 36 of the vehicle, strikes rigid sheet 10 and is diverted, at least in part, back into the wheel well 36 and away from adjacent automobiles. See FIG. 9.

If the water spray shield device needs to be removed from the designated vehicle, this is readily accomplished by removing fastener 24, and then withdrawing rigid sheet 10 from mounting means 16.

ALTERNATIVE EMBODIMENTS

While the above description contains many specificities, these should not be construed as limitations on the scope of the invention, but rather as an exemplification of one preferred embodiment thereof. Many variations are possible and some are as follows.

Figure 8:
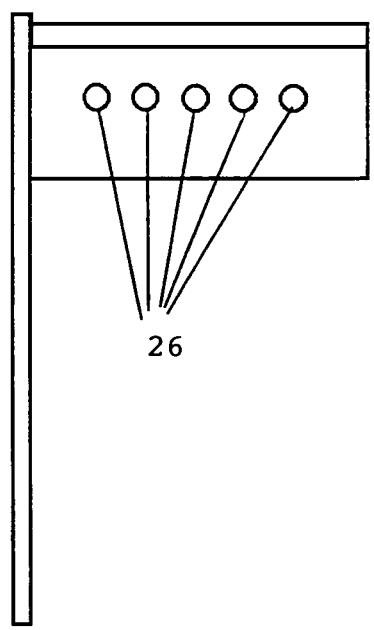
FIG. 8 is a Side View of the Rigid Sheet and Rear Insert Section Illustrating Multiple Rear Insert Holes

First, there may be more than one fastening means 14 using more than one fastener 24. That is, there can be multiple places on rear insert section 12 where multiple fastening means 14 and multiple fasteners 24 can be implemented. More specifically, and for the sake of example, multiple holes could be cut into rear insert section 12 allowing adjustable positioning of rigid sheet 10 relative to the wheel well of the vehicle upon which the device is mounted. This is illustrated in FIG. 8.

Figure 6:
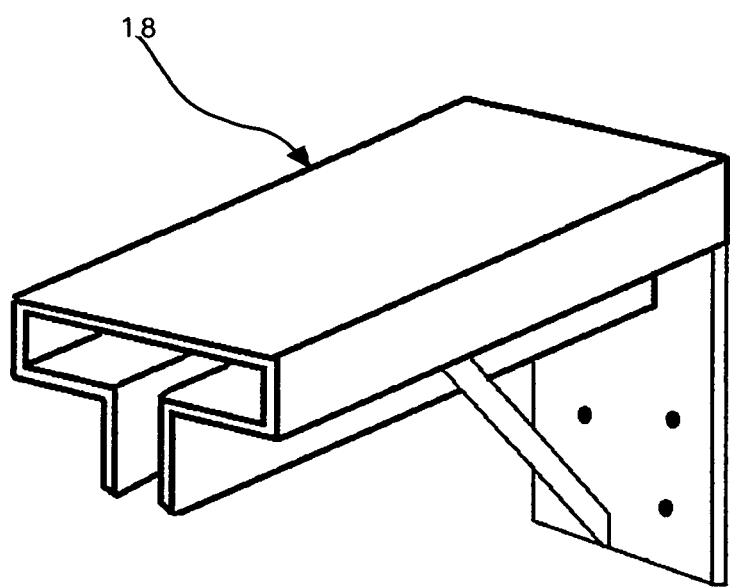
FIG. 6 is an Isometric View of the First Alternative Mounting Means

Second, mounting means 16 can take different shapes depending upon the vehicle upon which the device is to be mounted. That is, if the preferred embodiment of mounting means 16 does not fit a certain vehicle, an alternative mounting means can be used. As illustrated in FIG. 6, a first alternative mounting means 18 is shown. Preferably, the first alternative mounting means 18 is a bracket with hollow interior, which has a "T" shaped cross-section to allow the preferred embodiment of rear insert section 12 to be inserted into first alternative mounting means 18. Furthermore, first alternative mounting means 18 implements a diagonal brace, or braces, running from the lower portion of the "T" shaped cross section to a vertically aligned rear mounting plate, which incorporates frame mounting holes.

Figure 7:
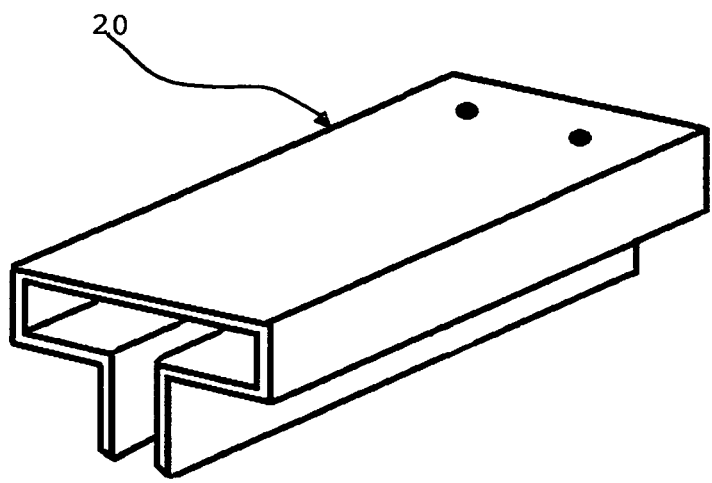
FIG. 7 is an Isometric View of the Second Alternative Mounting Means

In FIG. 7, a second alternative mounting means 20 is shown. As shown in FIG. 7, second alternative mounting means 20 utilizes a shorter overall length, and fewer frame mounting holes.

Thus, it can be seen that the shape of mounting means 16 can be adjusted to fit the vehicle upon which the device will be mounted, and that any particular shape used herein is for illustration purposes and not for limitation.

Third, the size and contours of rigid sheet 10 can be changed to better fit the space provided in the wheel well of any given vehicle. Depending on the dimensions of the wheel well of the vehicle to which the device will be mounted, it is a simple matter to modify the size, and contours of rigid sheet 10 to meet the dimensional requirements of a given wheel well.

Fourth, the cross-sectional shapes of rear insert section 12 and of mounting means 16 could be varied beyond the "T" shape used in the preferred embodiment. The cross-sectional shape of mounting means 16 should correspond to the implemented cross-sectional shape of rear insert section 12 in order for the two pieces to fit one within the other with ease; however, some variation between cross-sectional shapes could be used, if desired. So long as rear insert section 12 can fit into and be secured to mounting means 16, differing cross-sectional shapes would be adequate, if not quite ideal.

Fifth, while a cotter pin assembly has been stated to be the preferred implementation of fastening means 24 and fastener 14, many other fastening methods could be implemented in the alternative. For example, any variety of screw threads and nuts, with washers, if desired, could be used to secure rear insert section 12 to mounting means 16.

Sixth, if a user of the device wished to have the device permanently attached to a vehicle, welding could be used instead of fastening means 14, mounting fastening means 22, fastener 24, and fastening hole 30 to secure rear insert section 12 to mounting means 16. Simply, after rear insert section 12 is inserted into mounting means 16, the two pieces could be welded together for a permanent mating.

Likewise, mounting means 16 could be welded to the designated vehicle instead of using a plurality of frame mounting holes 28 to bolt, pin, or otherwise secure mounting means 16 to the intended vehicle frame.

The embodiments above-discussed are to be considered illustrative and not restrictive. Many more embodiments may be configured using combinations of the embodiments above-discussed. Thus, the scope of the invention should be determined by the appended claims and their legal equivalents.

CONCLUSIONS, RAMIFICATIONS, AND SCOPE

The utility of the mountable water spray shield is apparent. The device is easily mounted onto a designated vehicle. The device is readily accessible for maintenance and replacement purposes. Moreover, the device is designed to withstand exposure to road debris and prolonged emission of transverse water spray.

The above-discussion is to be considered illustrative and not restrictive. Thus, the scope of the invention should be determined by the appended claims and their legal equivalents.

I claim:

1. A water spray shield device comprising, in combination:
   a. a rigid sheet with an inverted, cropped tear-drop profile,
   b. a rear insert section,
   c. a rear insert hole,
   d. a bracket with hollow interior and frame mounting holes,
   e. a mounting fastening hole,
   f. a fastener,
   g. a vehicle frame,
   h. a wheel well, and
   i. a pair of tires,
   whereby said bracket with hollow interior and frame mounting holes is mounted on the vehicle frame within the area defined by the wheel well and between the pair of tires; said rear insert is placed within said bracket; said rear insert hole is aligned with the mounting fastening hole and secured with said fastener; such that said rigid sheet is positioned perpendicular to the length of the vehicle frame, between the pair of tires, and just beyond the outer walls of the pair of tires.

2. A method for diverting water spray with a mountable water spray shield device, comprising the steps of:
   a. providing a rigid sheet with an inverted, cropped tear-drop profile,
   b. providing a rear insert section,
   c. providing a rear insert hole,
   d. providing a bracket with hollow interior and frame mounting holes,
   e. providing a mounting fastening hole,
   f. providing a fastener,
   g. providing a vehicle frame,
   h. providing a wheel well,
   i. providing a pair of tires,
   j. mounting said bracket to the vehicle frame within the area defined by the wheel well and between the pair of tires,
   k. placing said rear insert within the hollow interior of said bracket,
   l. aligning said rear insert hole with said mounting fastening hole,
   m. securing said rear insert hole and fastening hole with said fastener,
   n. positioning said rigid sheet perpendicular to the length of the vehicle frame, between said pair of tires, and just beyond the outer walls of the pair of tires, via proper alignment of said rear insert hole with said mounting fastening hole,
   whereby water spray normally generated and emitted from the wheel well of said vehicle by operating said vehicle on a wet roadway is diverted away from adjacent traffic by said mountable water spray shield device.

* * * * *